(12) United States Patent
Saracco et al.

(10) Patent No.: US 10,742,942 B2
(45) Date of Patent: Aug. 11, 2020

(54) OPTICAL POWER SENSING DEVICES AND METHODS

(71) Applicant: Microvision, Inc., Redmond, WA (US)

(72) Inventors: Matthieu Saracco, Redmond, WA (US); Alga Lloyd Nothern, III, Seattle, WA (US); Thomas Byeman, Redmond, WA (US)

(73) Assignee: Microvision, Inc., Redmond, WA (US)

( * ) Notice: Subject to any disclaimer, the term of this patent is extended or adjusted under 35 U.S.C. 154(b) by 206 days.

(21) Appl. No.: 15/894,582

(22) Filed: Feb. 12, 2018

(65) Prior Publication Data
US 2019/0253678 A1  Aug. 15, 2019

(51) Int. Cl.
*H04N 9/31* (2006.01)
*G02B 27/14* (2006.01)
*G02B 5/30* (2006.01)
*G02B 26/10* (2006.01)
*G02B 26/08* (2006.01)
*G02B 27/10* (2006.01)
*G01J 1/42* (2006.01)

(52) U.S. Cl.
CPC .......... *H04N 9/3191* (2013.01); *G01J 1/4257* (2013.01); *G02B 5/3025* (2013.01); *G02B 26/0816* (2013.01); *G02B 26/101* (2013.01); *G02B 27/108* (2013.01); *G02B 27/14* (2013.01); *H04N 9/312* (2013.01); *H04N 9/3129* (2013.01); *H04N 9/3161* (2013.01); *H04N 9/3164* (2013.01); *H04N 9/3167* (2013.01)

(58) Field of Classification Search
CPC .............. G02B 5/3025; G02B 26/0816; G02B 26/101; G02B 27/108; G02B 27/14; H04N 9/3191; H04N 9/312; H04N 9/3129; H04N 9/3161; H04N 9/3164; H04N 9/3167; G01J 1/4257
USPC ......... 359/200.8, 201.2, 202.1, 204.1–204.3, 359/487.01, 489.08, 490
See application file for complete search history.

(56) References Cited

U.S. PATENT DOCUMENTS

| | | | | |
|---|---|---|---|---|
| 5,245,471 A | * | 9/1993 | Iwatsuka | G02B 5/3083 359/484.03 |
| 5,748,369 A | * | 5/1998 | Yokota | G02B 27/283 349/9 |
| 2005/0213103 A1 | * | 9/2005 | Everett | A61B 5/0066 356/479 |
| 2011/0176193 A1 | * | 7/2011 | Maeda | G02B 26/123 359/204.3 |

* cited by examiner

*Primary Examiner* — Jie Lei
(74) *Attorney, Agent, or Firm* — Kevin D. Wills

(57) ABSTRACT

Devices and methods are described herein to measure optical power in scanning laser projectors. In general, the devices and methods utilize a polarizing component and photodiode to measure optical power being generated by at least one laser light source. The polarizing component is configured to polarize at least a portion of the laser beam in a way that improves the accuracy and consistency of this optical power measurement. Specifically, the polarizing component filters at least a portion of the laser beam for one polarization state in a way that facilitates improved reliability in the amount of laser light directed into the photodiode.

7 Claims, 5 Drawing Sheets

OPTICAL POWER SENSING DEVICES AND METHODS

FIELD

The present disclosure generally relates to scanning optical power measurement, and more particularly relates to optical power measurement in scanning laser devices.

BACKGROUND

In scanning laser devices, laser light is reflected off a scanning mirror to form a scan the laser light into a pattern. For example, in scanning laser projectors, pixels are typically generated by modulating light from the laser light sources as the scanning mirror scans the modulated light in a raster pattern. In scanning laser devices it is generally desirable to have measurements of optical power being generated by the laser light sources. Such measurements can be used to provide feedback to accurately control the laser light sources. Unfortunately, some previous techniques for measuring the optical power generated by laser light sources have been excessively bulky and/or costly.

As such, there remains a need for improved devices and methods for measuring the optical power generated by laser light sources in a in a scanning laser device.

DESCRIPTION OF EMBODIMENTS

The embodiments described herein provide devices and methods for measuring optical power in scanning laser devices, including scanning laser projectors. In general, the optical power sensors and methods utilize a polarizing component, beam splitter, and photodiode to measure the optical power being generated by at least one laser light source. Specifically, the beam splitter directs a portion of the laser beam into the photodiode, and the photodiode generates a signal proportional to the optical power in the directed portion of the laser beam. The polarizing component is configured to polarize at least a portion of the laser beam in a way that improves the accuracy and consistency of this optical power measurement. Specifically, the polarizing component filters at least a portion of the laser beam for one polarization state in a way that facilitates improved reliability in the amount of laser light directed into the photodiode. Such a configuration thus facilitates accurate optical power measurement by ensuring that a consistent percentage of laser light power is received by the photodiode, and thus can facilitate accurate optical power measurement in a relatively compact device and with relatively low cost.

The embodiments described herein can facilitate the use of laser light sources that have relatively poor or highly variable polarization extinction ratios but are otherwise desirable, where the polarization extinction ratio is defined as the ratio of optical power in perpendicular polarizations (e.g., p-polarization and s-polarization). For example, the embodiments described herein can facilitate the use of laser diodes in a P-doping region side down configuration where mechanical stress can be applied by the heatsink in a way that will lower the polarization extinction ratio. Similarly, the embodiments described herein can facilitate the use of laser diodes that have relatively high variability in polarization extinction ratio in response to drive current and temperature changes. Such laser diodes can be otherwise relatively inexpensive and efficient, and thus the embodiments described herein can provide low cost and efficient scanning laser devices by facilitating the use of such laser diodes.

Figure 1:
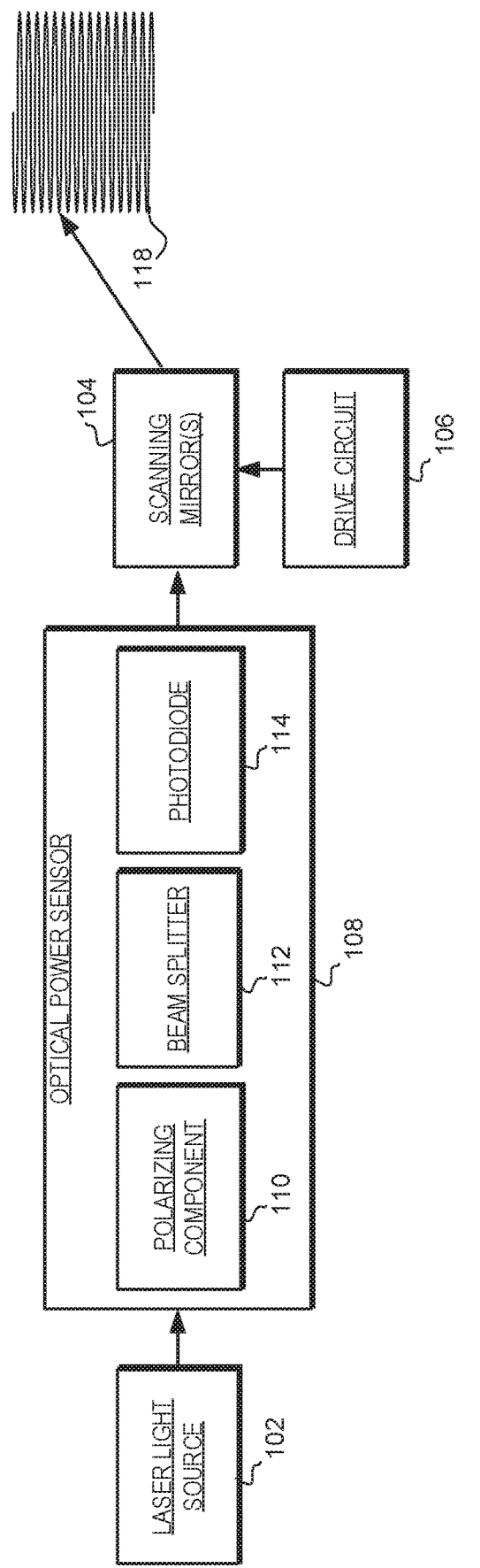
FIG. 1 shows a schematic diagram of a scanning laser device in accordance with various embodiments of the present invention.

Turning now to FIG. 1, a schematic diagram of a scanning laser device 100 is illustrated. The scanning laser device 100 includes a laser light source 102, scanning mirror(s) 104, a drive circuit 106, and an optical power sensor 108. During operation, the laser light source 102 provides a beam of laser light that is to be projected by the scanning laser device 100. To facilitate this projection, the drive circuit 106 controls the movement of the scanning mirror(s) 104. Specifically, the drive circuit 106 provides excitation signal(s) to excite motion of the scanning mirror(s) 104.

During operation of the scanning laser device 100, the scanning mirror(s) 104 are controlled by the drive circuit 106 to reflect the beams of laser light into a pattern 118. This scanning laser projection into the pattern 118 can be used for a variety of application, including depth sensing and image projection.

In accordance with the embodiments described herein, the optical power sensor 108 is inserted into the optical path of the scanning laser device 100 to provide a measurement of the optical power generated by the laser light source 102. The optical power sensor 108 utilizes a polarizing component 110, a beam splitter 112, and a photodiode 114 to measure optical power being generated by at least one laser light source. Specifically, during operation of the scanning laser device 100 the beam splitter 112 directs a portion of the laser beam into the photodiode 114. In response, the photodiode 114 generates a signal proportional to the optical power in the directed portion of the laser beam. This signal can then be used to provide a measure of the total optical power generated by the laser light source 102. When so determined, the measure of the optical power can be used as a feedback for control of the laser light source 102. For example, the measure of the optical power can be used to control one or more laser diodes of different colors to maintain the white point in a laser scanning projector.

The polarizing component 110 is configured to polarize at least a portion of the laser beam in a way that improves the accuracy of the optical power measurement. Specifically, the polarizing component 110 filters at least a portion of the laser beam for one polarization state in a way that facilitates improved consistency in the portion of laser light directed into the photodiode 114. Stated another way, the polarizing component 110 ensures that a known percentage of the laser beam is directed into the photodiode 114, and thus ensures that the signal generated by the photodiode 114 can be used to accurately determine the overall power in the laser beam.

In a typical embodiment, the optical power sensor 108 receives the laser beam at the beam splitter 112, and the beam splitter 112 splits the laser beam into a first portion and a second portion. The first portion of the laser beam is directed to the photodiode 114 for optical power measurement, while the second portion of the laser beam is directed to the scanning mirrors 104 for image projection. In a typical embodiment the first portion of the laser beam directed toward the photodiode 114 will contain only a relatively small percentage (e.g., ~1%) of the overall optical power generated by the laser light source 102. And as was described above, the polarizing component 110 ensures that this small percentage is accurate and consistent, and thus ensures that the signal generated by the photodiode 114 can be used to accurately determine the overall power in the laser beam. Finally, directing only a small percentage of the laser beam to the filter component assures that a majority of the optical power is sent to the projected image and thus increases the overall power efficiency of the scanning laser projector.

A variety of devices can be implemented as the beam splitter 112. For example, the beam splitter can be implemented as an uncoated glass window positioned to receive the laser beam at a determined angle of incidence. Examples of such implementations will be described in FIGS. 2-4 below. Other examples of how the beam splitter 112 can be implemented include coated windows and optical cubes configured for beam splitting.

It should be noted that while FIG. 1 shows the optical power sensor 108 receiving the laser light directly from the laser light source 102, that this is just one example embodiment. In other embodiments there can be additional optical elements inserted between the laser light source 102 and the optical power sensor 108. Furthermore, there can be additional optical elements inserted between the optical power sensor 108 and the scanning mirrors 104. For example, additional optical elements used to combine multiple laser beams together can be inserted between the optical power sensor 108 and the scanning mirrors 104.

The laser light source 102 can comprise any suitable type and combination of laser light sources. For example, the laser light source 102 can include multiple component color sources to facilitate image projection. The laser light source 102 can also include one or more infrared sources. As one specific example that will be described in greater detail below, the laser light source 102 can include red, green and blue lasers to facilitate image projection and infrared lasers to facilitate depth mapping. In embodiments with multiple different light sources each of the sources can include its own optical power sensor 108 to facilitate individual measurement and control of the light source. In other embodiments the optical power sensor 108 can be configured to measure power in a combined laser beam generated from multiple light sources to provide a single overall measurement.

In a typical embodiment, each of these lasers in the light source 102 can be implemented using one or more suitable laser diodes. Furthermore, these laser diodes can be substantially linearly polarized to facilitate the use of reflection in the beam splitter 112. Specifically, the use of linearly polarized lasers in light source 102 facilitates the use Fresnel reflection for the beam splitter 112, as will be described in greater detail below.

In one specific embodiment the laser light source 102 includes at least one linearly polarized laser diode in a P-side down configuration. Such laser diodes can be relatively inexpensive and efficient and thus are desirable for use in scanning laser devices. However, such laser diodes can also have relatively poor polarization control, and this can lead to relatively poor polarization extinction ratios. This is particularly true for laser diodes that are mounted to a heatsink in a way that can apply stress to the diode.

In general, the polarizing component 110 is configured to adjust the polarization of at least a portion of the laser beam in a way that improves the accuracy of the optical power measurement. For example, by filtering for polarization state in a way that reduces possible variance in the percentage of light directed to the photodiode 114.

In one embodiment, the polarizing component is positioned between the beam splitter 112 and the photodiode 114. Thus, the first portion of the laser beam is directed by the beam splitter 112 to the polarizing component 110. The polarization component 110 adjusts the polarization of the first portion of the laser beam by filtering the first portion for one polarization state. The filtered first portion of the laser beam is then directed to the photodiode 114. In such an embodiment the polarizing component 110 can be affixed to an input surface of the photodiode 114, or it can be separate from the photodiode 114.

In one specific example, the polarizing component 110 is configured to filter the first portion of the laser beam for one polarization state by passing light having a p-polarization with reference to a first incident surface of the beam splitter and blocking light having s-polarization with reference to the first incident surface.

In another embodiment, the polarizing component 110 is positioned between the laser light source 102 and the beam splitter 112. In this embodiment the entire laser beam is directed to the polarizing component 110 filtered by polarization state. As will be described in greater detail below, such an embodiment can reduce efficiency and brightness.

In one specific embodiment, the polarizing component 110 comprises a polarizing layer formed on the beam splitter 112. Such a polarizing layer can be implemented with a dielectric material formed on the input surface of beam splitter 112. In other embodiments the polarizing layer can be implemented with a multi-layer interference coating formed on the beam splitter 112.

A variety of different devices and structures can be used to implement the polarizing component 110. As one example, the polarizing component 110 can be implemented as a thin film polarizer. In other such embodiments the polarizing component 110 can be implemented with a polarizing beam splitter (PBS) cube, PBS plate, wire grid polarizer, birefringent crystal PBS, or Brewster window.

The beam splitter 112 can be implemented with any suitable type of beam splitter. For example, the beam splitter 112 can be implemented with a window positioned to use Fresnel reflection for beam splitting. Detailed examples of such an embodiment will be discussed below. In other embodiments, the beam splitter 112 can be implemented with any suitable transparent material having a refractive index greater than 1. For example, a variety of glass and plastic materials can be used.

The photodiode 114 can be implemented with any suitable photodiode. For example, Si and GaAs photodiodes can be used. Additionally, the photodiode 114 can be implemented with PIN and avalanche photodiodes, as non-limiting examples.

Figure 2:
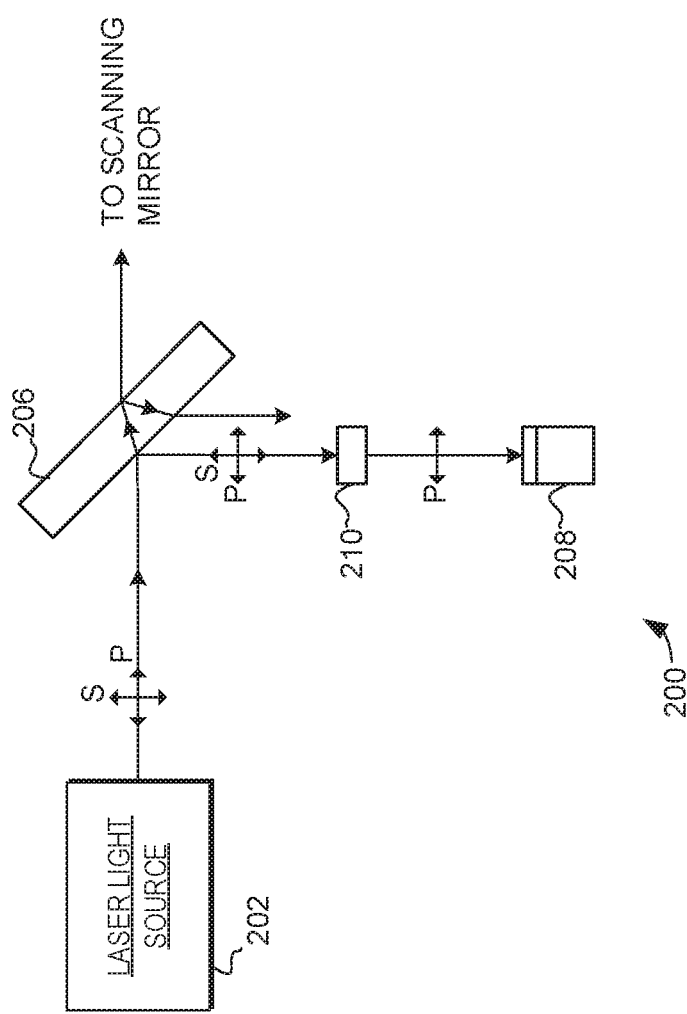
FIG. 2 shows a schematic view of an optical power sensor in accordance with an embodiments of the present invention.
Figure 3:
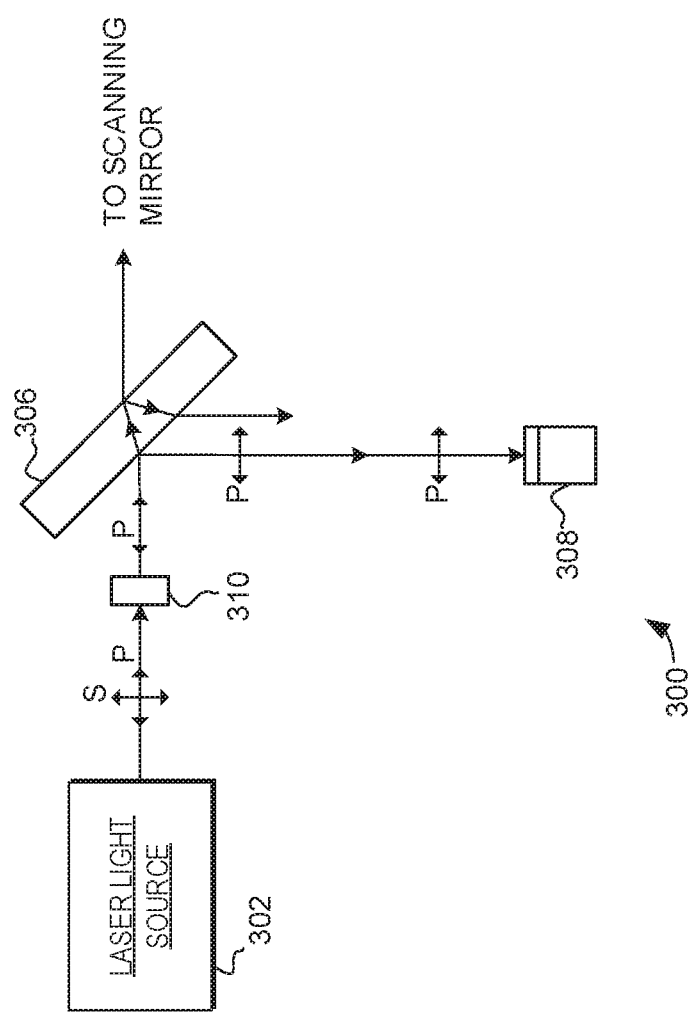
FIG. 3 shows a schematic view of an optical power sensor in accordance with an embodiments of the present invention.
Figure 4:
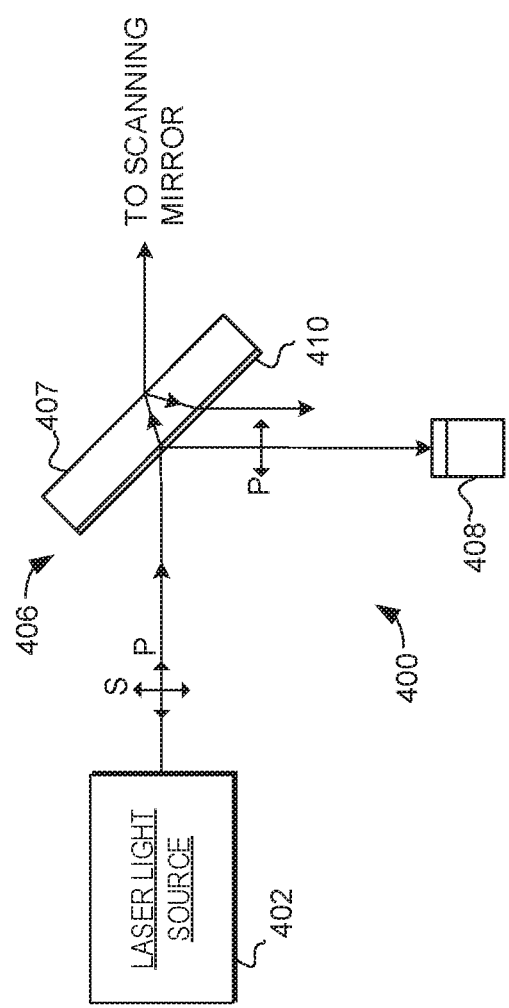
FIG. 4 shows a schematic view of an optical power sensor in accordance with an embodiments of the present invention.

Turning now to FIGS. 2-4, various examples of optical power sensors are illustrated in greater detail. Specifically, FIG. 2 illustrates a more detailed embodiment of an optical power sensor 200. The optical power sensor 200 includes a beam splitter 206, a polarizing component 210, and a photodiode 208. Again, the optical power sensor 200 is inserted into the optical path of a scanning laser device to provide an accurate measure of the optical power being provided by the laser light source 202.

In general, the optical power sensor 200 provides a measurement of the optical power generated by the laser light source 202 by reflecting a known percentage of the laser light to the photodiode 208, while the remaining light is directed to the scanning mirrors. The photodiode 208 generates a current responsive to the received light. Because the percentage of light reflected to the photodiode is known, this current can be used to provide a measure of the total optical power generated by the laser light source 202.

In the embodiment of FIG. 2, the beam splitter 206 receives the laser beam and splits the laser beam into a first portion and a second portion. The first portion of the laser beam is directed to the polarizing component 210, while the second portion of the laser beam is directed to the scanning mirrors for image projection.

In this illustrated embodiment the beam splitter 206 can comprise an uncoated glass window positioned to receive the laser beam at a specific angle of incidence, with that angle of incidence selected to cause reflection of the first portion of light toward the polarizing component 210, while the second portion passes through the glass window and to the scanning mirrors. In such an embodiment, the beam splitter 206 can use Fresnel reflection to achieve this beam splitting. In Fresnel reflection, partial light reflection is caused by the difference in refractive indices between two materials, while the reflected light ratio is also dependent on the angle of incidence of the beam at the interface. Using Fresnel reflection allows the beam splitter 206 to reflect a selected percentage of light toward the photodiode 208 while the remaining light is passed to the scanning mirrors. Specifically, the percentage of light reflected can be controlled based on the indices of the material used and the angle of incidence on the window.

However, the percentage of light reflected by Fresnel reflection is also highly dependent upon the polarization of the light. Specifically, in Fresnel reflection light having a polarization parallel to plane of incidence is reflected in relatively small amounts, while light have a polarization orthogonal to the plane of incidence is reflected in much larger amounts. For example, in the embodiment of FIG. 2 the percentage of p-polarized light parallel to the incidence pane that will be reflected is on the order ~1 percent, while the percentage of s-polarized light orthogonal to the incidence pane that will be reflected is on the order of ~10 percent.

Thus, in such a device the total percentage of reflected light will vary with any changes polarization extinction ratio, i.e., changes in the ratio of p-polarized light to s-polarized light. Again, in some types of laser such changes can occur due to variations in drive current and temperature.

As one specific example, with an uncoated BK7 glass window configured to have a 45 incidence angle and a laser light source of 640 nm having a 10000:1 polarization extinction ratio, the percentage of optical power in the reflected light will be ~0.9 percent, while ~99 percent of optical power is passed to the scanning mirrors. However, if the polarization extinction ratio is reduced to 40:1 due to manufacturing variations or changing operating conditions the reflected optical power increase to ~1.4 percent. Because a greater percentage of the light is being reflected toward the photodiode this variation in polarization extinction ratio could in an incorrect measurement of total optical power. Thus, such a change in polarization extinction ratio can dramatically degrade the accuracy the resulting power measurement generated by the photodiode 208. In the embodiment of FIG. 2, the polarization component 210 is provided to compensate for these possible changes in polarization extinction ratio and thus can maintain the accuracy of the optical power measurement.

As noted above, the first portion of light reflected from the beam splitter 206 is directed to the polarization component 210. In general, polarization component 210 is configured to adjust the polarization of the first portion of light to at least partially compensate for these possible variations in polarization extinction ratio and the resulting variation in the amount of light reflected toward the photodiode 208. Thus, the polarizing component 210 can improves the accuracy and consistency of this optical power measurement provided by the photodiode 208.

For example, the polarization component 210 can be configured to filter the laser light by polarization state to block any s-polarization light from reaching the photodiode 208. By filtering out or otherwise blocking any s-polarization light in the first portion the polarizing component 210 facilitates improved consistency in the percentage of laser light directed into the photodiode 208. Specifically, by filtering out any s-polarized light the polarization component 210 removes the majority of variation in power measurement that would occur due to variations in polarization extinction ratio. Thus, variations due to temperature or current can be at least partially compensated for, and laser light sources with move polarization variation can be effectively used.

The polarization component can be implemented with any suitable polarization device. For example, the polarizing component 210 can be implemented with a polarizing beam splitter (PBS) cube, wire grid polarizer, birefringent crystal PBS, or Brewster window. Additionally, in single wavelength implementations PBS plates can be used.

It should be noted that while FIG. 2 illustrates the polarization component 210 as separate from the photodiode 208, this is just one example and other embodiments are possible. For example, the polarization component 210 can instead be implemented at the input surface of the photodiode 208. In such an embodiment the polarization component can implemented with any suitable thin film polarizer, such as dielectric polarizers, wire grid polarizers, etc.

In some embodiments of FIG. 2 light sinks can be provided to absorb stray light that could otherwise reflect further and interfere with the operation of the scanning laser device. These light sinks can be implemented with suitable black painted surfaces or other optical absorbing materials.

Turning now to FIG. 3, another detailed embodiment of an optical power sensor 300 is illustrated. The optical power sensor 300 again includes a beam splitter 306, a polarizing component 310, and a photodiode 308. Again, the optical power sensor 300 is inserted into the optical path of a scanning laser device to provide an accurate measure of the optical power being provided by the laser light source 302. The optical power sensor 300 again provides a measurement of the optical power generated by the laser light source 302 by reflecting a known percentage of the laser light to the photodiode 308, while the remaining light is directed to the scanning mirrors.

In the embodiment of FIG. 3, the polarizing component 310 is positioned in the optical path before the beam splitter 306, rather than between the beam splitter 306 and the photodiode 308. The polarization component 310 thus receives and polarizes the entire laser beam outputted by the laser light source 302.

It should be noted that placing the polarization component 310 before the beams splitter 306 can introduce complications. For example, the polarization component 310 must be sufficiently robust to handle the entire optical power output of the laser light sources. Additionally, this configuration of the polarization component 310 can result in reduced power efficiency, as more light will be prevented from reaching the scanning mirrors.

Like the embodiment of FIG. 2, the beam splitter 306 can comprise an uncoated glass window positioned to receive the laser beam at a specific angle of incidence. Thus, the beam splitter 306 can use Fresnel reflection to achieve this beam splitting. Using Fresnel reflection again allows the beam splitter 306 to reflect a selected percentage of light toward the photodiode 308 while the remaining light is passed to the scanning mirrors. However, the percentage of light reflected by Fresnel reflection is also highly again dependent upon the polarization of the light.

The polarization component 310 is again configured to adjust the polarization of the light beam generated by the laser light source 302. Specifically, the polarization component 310 can again be configured to block any s-polarization light. This prevents s-polarization from reaching the beam splitter 306 and thus from being reflected toward the photodiode 308. By filtering out or otherwise blocking any s-polarization light the polarizing component 310 again facilitates improved consistency in the percentage of laser light directed into the photodiode 308. Specifically, by filtering out any s-polarized light the polarization component 310 removes the majority of variation in power measurement that would occur due to variations in polarization extinction ratio. Thus, variations due to temperature or current can be at least partially compensated for, and laser light sources with move polarization variation can be effectively used.

Turning now to FIG. 4, another detailed embodiment of an optical power sensor 400 is illustrated. The optical power sensor 400 again includes a beam splitter 406, and a photodiode 408. Again, the optical power sensor 400 is inserted into the optical path of a scanning laser device to provide an accurate measure of the optical power being provided by the laser light source 402. The optical power sensor 400 again provides a measurement of the optical power generated by the laser light source 402 by reflecting a known percentage of the laser light to the photodiode 408, while the remaining light is directed to the scanning mirrors.

In the embodiment of FIG. 4, the beam splitter 406 includes a polarizing component 410 formed on the first incident surface of a window 407. In general, the polarization component 410 filters the first portion of the laser beam for one polarization state and thus adjusts the polarization of the first portion of the laser beam reflected to photodiode 408. Specifically, in this embodiment the polarizing component 410 provides an anti-reflective effect to light having a first polarization with reference to a first incident surface of the beam splitter 410, while not providing a significant anti-reflective effect to light having a second polarization with reference to the first incident surface. This allows light of the first polarization to pass to the scanning mirrors, while the light of the second polarization is reflected to the photodiode 408. Again, this reduces changes in power measurement that could otherwise occur due to variations in polarization extinction ratio.

As one specific example, the first polarization can comprise an s-polarization with reference to the first incident surface while the second polarization can comprise a p-polarization with reference to the first incident surface. By providing an anti-reflective coating for s-polarization light, the polarizing component 410 again facilitates improved consistency in the percentage of laser light directed into the photodiode 408. Specifically, by preventing s-polarized light from being reflected the polarization component 410 can reduce variation in power measurement due to changes in polarization in the light source 402.

In an alternative embodiment, the polarizing component 410 provides an anti-reflective effect to light having a p-polarization with reference to a first incident surface of the beam splitter 410, while not providing a significant anti-reflective effect to light having s-polarization. Because s-polarized light is reflected in significantly higher percentages in Fresnel reflection such an embodiment can reflect nearly 10% of the total light to the photodiode 408 while again providing low variations in polarization extinction ratio. This alternative embodiment can be useful in low power applications where directing larger amounts of light to the photodiode 408 is desirable. For example, in applications where the overall brightness of the projected image is not critical.

In this embodiment, the polarization component can be implemented with any suitable polarizing layer that can be formed on the window 407. For example, the polarization component 410 can be implemented with a thin film polarizer. As a specific example, a dielectric coating that is formed on the input surface of the beam splitter 406 can be used as the polarization component 410. As another specific example, a multi-layer interference coating formed on the surface of the beam splitter 406 can be used as the polarization component 410.

In this embodiment, the beam splitter 406 can again be implemented with any suitable window 407 positioned to use Fresnel reflection for beam splitting. As examples, the beam splitter 406 can be implemented with any suitable transparent material having a refractive index greater than 1, including glass and plastic materials.

The optical power sensors 108, 200, 300 and 400 described above can implemented in a wide variety of scanning laser devices. For example, the optical power sensors can be implemented in laser depth scanners designed to generate 3D depth maps. As another example, the optical power sensors can be implemented in a scanning laser projectors desired to project and display images.

Figure 5:
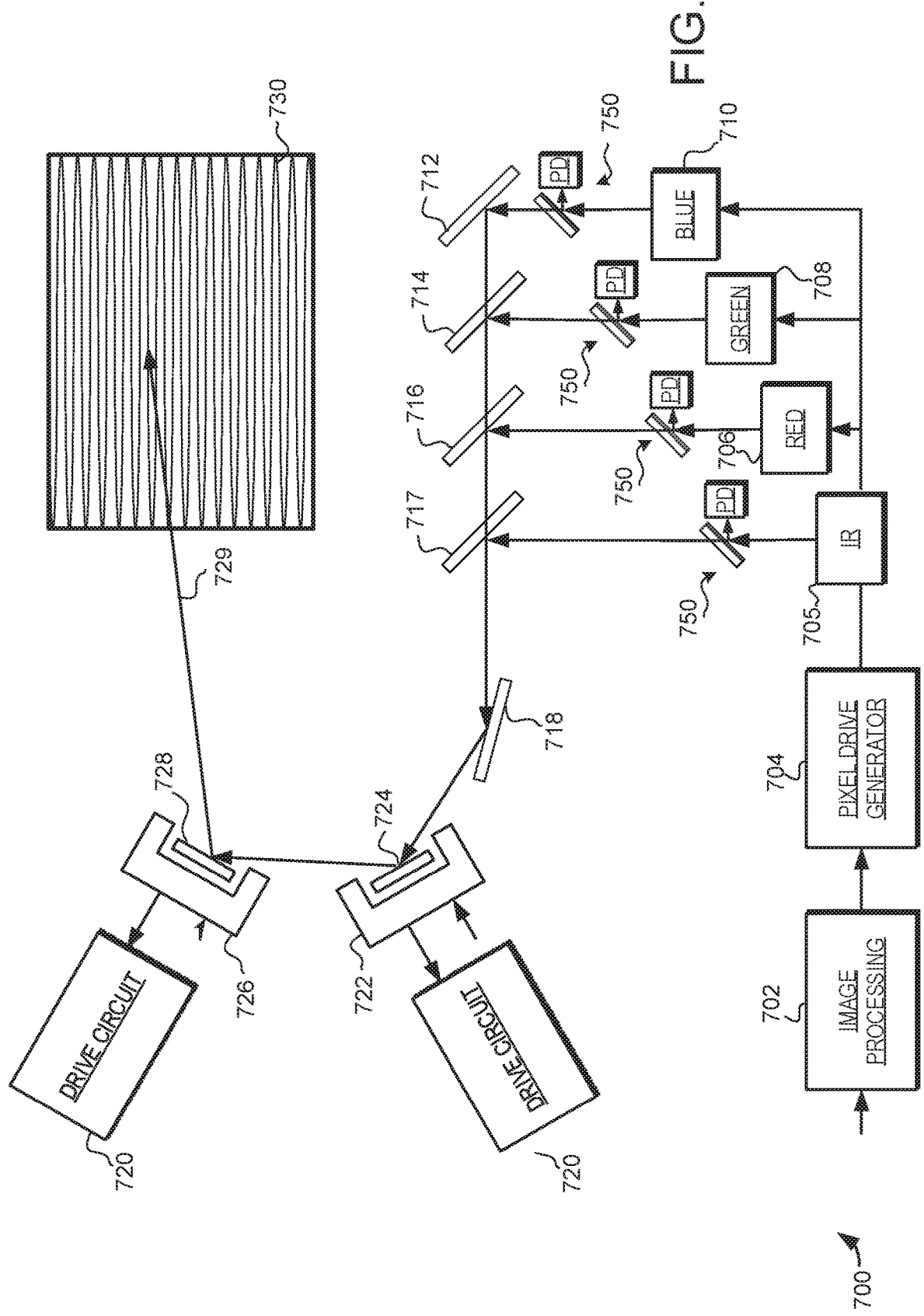
FIG. 5 shows a schematic view of a scanning laser projector in accordance with various embodiments of the present invention.

Turning now to FIG. 5, a schematic view of a scanning laser projector 700 is illustrated. The scanning laser projector 700 is a more detailed example of the type of laser scanning device that can be used in accordance with various embodiments of the present invention. Specifically, the scanning laser projector 700 can be implemented using optical power sensors 750, where one or more of those optical power sensors 750 can be implemented with the embodiments described above.

Scanning laser projector 700 includes an image processing component 702, a pixel drive generator 704, an infrared laser module 705, a red laser module 706, a green laser module 708, and a blue laser module 710. In such an embodiment, the red, green and blue light can be used for image projection, while the infrared light can be used for depth scanning. Light from the laser modules is combined with dichroics 712, 714, 716, and 717. Scanning laser projector 700 also includes fold mirror 718, drive circuits 720, a first scanner assembly 722 with first scanning mirror 724, and second scanner assembly 726 with a second scanning mirror 728. It should be noted that this illustrated arrangement for combing the outputs from the various laser modules is just one example implementation, and other implementations using different techniques for combing laser light of different wavelengths can instead be used.

In operation, image processing component 702 processes video content using two dimensional interpolation algorithms to determine the appropriate spatial image content for each scan position at which an output pixel is to be displayed by the pixel drive generator 704. For example, the video content may represent a grid of pixels at any resolution (e.g., 640×480, 848×480, 1280×720, and 1920×1080). The input light intensity encoding typically represents the light intensity in 8, 10, 12 bit or higher resolutions.

This content is then mapped to a commanded current for each of the red, green, and blue laser sources such that the output intensity from the lasers is consistent with the input image content. In some embodiments, this process occurs at output pixel rates in excess of 150 MHz. The laser beams are then directed onto scanning mirrors 724 and 728. In general, the first scanning mirror 724 provides for one axis of motion (e.g., horizontal), while the second scanning mirror 728 provides for another axis of motion (e.g., vertical). In a typical implementation of such an embodiment, the second scanning mirror 728 is operated to provide the vertical scanning motion at a relatively slow scan rate, while the first scanning mirror 724 is operated to provide horizontal motion at a relatively fast scan rate. This results in the output beam 729 generating a scanning pattern 730.

To provide such a system, the rotation of the second scanning mirror 728 can be operated quasi-statically to create a vertical sawtooth raster trajectory. Conversely, the rotation of the first scanning mirror 724 can be operated on a resonant vibrational mode of the scanning mirror 724 to create sinusoidal motion. Together, this generates both horizontal and vertical motion of the laser beam and results in the pattern 730 of scan lines.

In these embodiments, output beam 729 sweeps back and forth left-to-right in a sinusoidal pattern, and sweeps vertically (top-to-bottom) in a sawtooth pattern with the display blanked during flyback (bottom-to-top). It should be noted that the illustrated scanning pattern 730 shows a sinusoidal pattern as the beam sweeps vertically top-to-bottom, but does not show the flyback from bottom-to-top.

In other embodiments, the vertical sweep is controlled with a triangular wave such that there is no flyback. In still further embodiments, the vertical sweep is sinusoidal. Finally, the various embodiments of the invention are not limited by the waveforms used to control the vertical and horizontal sweep or the resulting raster pattern 730.

It should be noted that in some embodiments, the first scanner assembly 722 and the second scanner assembly 726 both use electromagnetic actuation. However, in other embodiments one more of the scanner assemblies can use other techniques, including electrostatic or piezoelectric actuation. Furthermore, any number of mirrors and type of mirror actuation may be employed without departing from the scope of the present invention.

The drive circuits 720 provide drive signals to scanner assemblies 722 and 726. The drive signals include excitation signals to control the motion of the scanning mirrors 724 and 728. In operation, the laser light sources produce light pulses for each output pixel and scanning mirrors 724 and 728 reflect the light pulses as the output beam 729 traverses the pattern 730. Drive circuits 720 can also receive feedback signals from scanner assemblies 722 and 726. The feedback signals can describe the driven deflection angles of the mirrors, and can be used by the drive circuits 720 to more accurately control the motion of the scanning mirrors 724 and 728.

For example, the drive circuits 720 can excite resonant motion of scanning mirrors 724 and/or 728 such that the peak amplitude of the feedback signal is constant. This provides for a stable maximum angular deflection on the fast-scan axis as shown in raster pattern 730. The excitation signal used to excite resonant motion of scanning mirrors 724 and 728 can include both amplitude and a phase. Drive circuits 720 can include feedback circuits that modify the excitation signal amplitude to keep the feedback signal peak amplitude substantially constant. Additionally, the drive circuits 720 can modify the excitation signal to control the horizontal phase alignment and vertical position of the raster pattern 730.

To facilitate this, drive circuits 720 may be implemented in hardware, a programmable processor, or in any combination. For example, in some embodiments, drive circuit 720 is implemented in an application specific integrated circuit (ASIC). Further, in some embodiments, some of the faster data path control is performed in an ASIC and overall control is provided by a software programmable microprocessor.

It should be noted that while FIG. 5 illustrates an embodiment with red, green, blue, and infrared laser light sources, the various embodiments are not limited to these exemplary wavelengths of laser light.

In accordance with the embodiments described herein, the scanning laser projector 700 includes four optical power sensors 750. In this embodiment each color laser (red, green, blue, and IR) includes its own optical power sensor 750. This allows the outputs of each laser to be individual measured and controlled. Each of the optical power sensors 750 can include a polarizing component, beam splitter, and a photodiode to measure optical power being generated by at least one laser light source. In each case polarizing component adjusts the polarization of the laser beam in a way that facilitates improved reliability in the amount of laser light directed into the photodiode. Such a configuration thus facilitates accurate optical power measurement by ensuring that a consistent percentage of laser light power is received by the photodiode, and thus can facilitate accurate optical power measurement in a relatively compact device and with relatively low cost.

In one embodiment, a scanning laser device is provided, comprising: at least one source of laser light, the at least one source of laser light configured to generate a laser beam; a beam splitter configured to receive the laser beam and split the laser beam into a first portion and a second portion; a polarizing component configured to filter the first portion of the laser beam for one polarization state; a photodiode configured to receive the filtered first portion of the laser beam; and at least one scanning mirror configured to reflect the second portion of the laser beam into a pattern.

In another embodiment, a scanning laser device is provided, comprising: at least one source of laser light, the at least one source of laser light configured to generate a laser beam; a beam splitter configured to receive the laser beam and split the laser beam into a first portion and a second portion; a polarizing component configured to receive the first portion of the laser beam and filter the first portion of the laser beam for one polarization state by passing light having a p-polarization with reference to a first incident surface of the beam splitter and blocking light having s-polarization with reference to the first incident surface; a photodiode configured to receive the filtered first portion of the laser beam; at least one scanning mirror configured to reflect the second portion of the laser beam; and a drive circuit configured to provide an excitation signal to excite motion of the scanning mirror to reflect the second portion of the laser beam in a pattern of scan lines.

In another embodiment, a scanning laser device is provided, comprising: at least one source of laser light, the at least one source of laser light configured to generate a laser beam; a beam splitter, the beam splitter including a polarizing layer formed on a window positioned to receive the laser beam at a determined angle of incidence, the beam splitter configured to receive the laser beam and split the laser beam into a first portion and a second portion, with the polarizing layer providing an anti-reflective effect to light having a first polarization with reference to a first incident surface while not providing a significant anti-reflective effect to light having a second polarization with reference to the first incident surface; a photodiode configured to receive the filtered first portion of the laser beam; at least one scanning mirror configured to reflect the second portion of the laser beam; and a drive circuit configured to provide an excitation signal to excite motion of the scanning mirror to reflect the second portion of the laser beam in a pattern of scan lines.

In another embodiment, a scanning laser device is provided, comprising: at least one source of laser light, the at least one source of laser light configured to generate a laser beam; a beam splitter having a first incident surface, the beam splitter configured to receive the laser beam and split the laser beam into a first portion and a second portion, a beam splitter configured to receive the laser beam and split the laser beam into a first portion and a second portion, wherein the beam splitter comprises a glass window having a first incident surface and being positioned to receive the laser beam at a determined angle of incidence on the first incident surface; a polarizing layer formed on the glass window, the polarizing layer configured to filter the first portion of the laser beam for one polarization state by passing light having a p-polarization with reference to the first incident surface of the beam splitter and blocking light having s-polarization with reference to the first incident surface: a photodiode configured to receive the filtered first portion of the laser beam; at least one scanning mirror configured to reflect the second portion of the laser beam; and a drive circuit configured to provide an excitation signal to excite motion of the scanning mirror to reflect the second portion of the laser beam in a pattern of scan lines.

In another embodiment, a scanning laser device is provided, comprising: at least one source of laser light, the at least one source of laser light configured to generate a laser beam; a polarizing component configured to receive the laser beam and filter the laser beam for one polarization state by passing light having a p-polarization with reference to a first incident surface of a beam splitter and blocking light having s-polarization with reference to the first incident surface, the beam splitter configured to receive the filtered laser beam and split the laser beam into a first portion and a second portion; a photodiode configured to receive the first portion of the laser beam; and at least one scanning mirror configured to reflect the second portion of the laser beam into a pattern.

The accompanying drawings that show, by way of illustration, specific embodiments in which the invention may be practiced. These embodiments were described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The preceding detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning laser device, comprising:
   at least one source of laser light, the at least one source of laser light configured to generate a laser beam, the at least one source of laser light having a temperature variant polarization extinction ratio;
   a beam splitter configured to receive the laser beam and split the laser beam into a first portion and a second portion, the beam splitter including a polarizing layer formed on a window positioned to receive the laser beam at a determined angle of incidence to split the laser beam using Fresnel reflection, the polarizing layer providing an anti-reflective effect to light having a first polarization with reference to a first incident surface of the window while not providing a significant anti-reflective effect to light having a second polarization with reference to the first incident surface, the anti-reflective effect to light having the first polarization at least partially compensating for effects of the temperature variant polarization extinction ratio in the at least one source of laser light;
   a photodiode configured to receive the first portion of the laser beam;
   at least one scanning mirror configured to reflect the second portion of the laser beam into a pattern; and
   a drive circuit configured to provide an excitation signal to excite motion of the scanning mirror.

2. The scanning laser device of claim 1, wherein the polarizing layer comprises a dielectric layer.

3. The scanning laser device of claim 1, wherein the polarizing layer comprises a multi-layer interference coating.

4. The scanning laser device of claim 1, wherein the at least one source of laser light comprises a P-doping region side down laser diode.

5. The scanning laser device of claim 1, wherein the first polarization with reference to the first incident surface comprises an s-polarization with reference to the first incident surface.

6. The scanning laser device of claim 1, wherein the first polarization with reference to the first incident surface comprises an s-polarization with reference to the first incident surface and wherein the second polarization with reference to the first incident surface comprises a p-polarization with reference to the first incident surface.

7. A scanning laser device, comprising:
   at least one source of laser light, the at least one source of laser light configured to generate a laser beam, wherein the at least one source of laser light comprises a P-doping region side down laser diode resulting in significant temperature dependent variability in polarization extinction ratio in the laser beam;

a beam splitter configured to receive the laser beam and split the laser beam into a first portion and a second portion, the beam splitter including a polarizing layer comprising a multi-layer interference coating formed on a first incident surface of a window positioned to receive the laser beam at a determined angle of incidence to split the laser beam using Fresnel reflection, the polarizing layer providing an anti-reflective effect to light having a first polarization with reference to the first incident surface of the window while not providing a significant anti-reflective effect to light having a second polarization with reference to the first incident surface, wherein the anti-reflective effect to light having the first polarization at least partially compensates for effects of the temperature dependent polarization extinction ratio in laser beam, and wherein the first polarization with reference to the first incident surface comprises an s-polarization with reference to the first incident surface and wherein the second polarization with reference to the first incident surface comprises a p-polarization with reference to the first incident surface, and;

a photodiode configured to receive the first portion of the laser beam;

at least one scanning mirror configured to reflect the second portion of the laser beam into a pattern; and a drive circuit configured to provide an excitation signal to excite motion of the scanning mirror.

* * * * *